United States Patent
Kang

(10) Patent No.: US 7,787,909 B2
(45) Date of Patent: Aug. 31, 2010

(54) SYSTEM AND METHOD FOR RECEIVING A SIGNAL ON A MOBILE TERMINAL

(75) Inventor: Do-Woo Kang, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 1118 days.

(21) Appl. No.: 10/998,023

(22) Filed: Nov. 24, 2004

(65) Prior Publication Data
US 2005/0113146 A1 May 26, 2005

(30) Foreign Application Priority Data
Nov. 25, 2003 (KR) .................... 10-2003-0084157

(51) Int. Cl.
*H04M 1/00* (2006.01)
(52) U.S. Cl. .............. 455/566; 455/550.1; 455/90.3; 455/553.1
(58) Field of Classification Search .......... 455/566, 455/550.1, 90.3, 553.1, 456.1, 404.2, 226.1, 455/67.1, 556.1, 132
See application file for complete search history.

(56) References Cited

U.S. PATENT DOCUMENTS

| | | | |
|---|---|---|---|
| 5,748,154 A * | 5/1998 | Yokota ..................... 343/702 |
| 5,764,760 A * | 6/1998 | Grandbert et al. ...... 379/433.13 |
| 6,128,515 A | 10/2000 | Kabler et al. |
| 6,304,211 B1 * | 10/2001 | Boman ................... 342/357.08 |
| 6,336,061 B1 * | 1/2002 | Deines et al. ................. 701/13 |
| 6,731,959 B1 * | 5/2004 | Kumagai et al. .......... 455/575.3 |
| 6,844,845 B1 * | 1/2005 | Whiteside et al. ........ 342/357.1 |
| 7,016,656 B2 * | 3/2006 | Odashima et al. .......... 455/74.1 |
| 7,031,730 B1 * | 4/2006 | Barber et al. ............... 455/457 |
| 7,324,810 B2 * | 1/2008 | Nave et al. ............... 455/414.1 |
| 7,326,846 B2 * | 2/2008 | Terada ......................... 84/609 |
| 2002/0154604 A1 * | 10/2002 | Huhtala ..................... 370/241 |
| 2003/0003948 A1 * | 1/2003 | Dai ............................ 455/550 |
| 2003/0099315 A1 * | 5/2003 | Beaudin ..................... 375/347 |
| 2003/0125078 A1 * | 7/2003 | Hong ......................... 455/556 |
| 2004/0033808 A1 * | 2/2004 | Rorabaugh ............... 455/456.1 |
| 2004/0130484 A1 * | 7/2004 | Krasner ................. 342/357.02 |
| 2004/0204035 A1 * | 10/2004 | Raghuram et al. ....... 455/553.1 |
| 2004/0204043 A1 * | 10/2004 | Wang et al. ............. 455/556.1 |
| 2004/0247058 A1 * | 12/2004 | Abraham ................... 375/346 |
| 2005/0014537 A1 * | 1/2005 | Gammon et al. ......... 455/575.1 |

FOREIGN PATENT DOCUMENTS

| | | |
|---|---|---|
| EP | 1152254 | 11/2001 |
| JP | 10-339772 | 12/1998 |
| JP | 2002-314313 | 10/2002 |
| KR | 010036216 | 5/2001 |
| KR | 20-0249984 | 11/2001 |
| KR | 10-2002-0035059 | 5/2002 |
| WO | WO 02-084792 | 10/2002 |

* cited by examiner

*Primary Examiner*—Joseph H Feild
*Assistant Examiner*—Huy D Nguyen
(74) *Attorney, Agent, or Firm*—Lee, Hong, Degerman, Kang & Waimey

(57) ABSTRACT

A system and method is disclosed for a receiver mounted to a mobile terminal. The system provided comprises a first receiver mounted with a vibrating motor on a side of a display unit for receiving a first frequency signal. In one embodiment, the side is an upper side of the display unit. In another embodiment, a second receiver is disposed on the mobile terminal for receiving a second frequency signal. The system, in one embodiment, comprises a first antenna disposed on a side of the mobile communication terminal.

4 Claims, 6 Drawing Sheets

SYSTEM AND METHOD FOR RECEIVING A SIGNAL ON A MOBILE TERMINAL

CROSS-REFERENCE TO RELATED APPLICATIONS

Pursuant to 35 U.S.C. §119(a), this application claims the benefit of earlier filing date and right of priority to Korean Application No. 10-2003-0084157, filed on Nov. 25, 2003, the contents of which are hereby incorporated by reference herein in their entirety.

BACKGROUND OF THE INVENTION

1. Field of the Invention

The present invention relates to a mobile terminal and, more particularly, to a mobile terminal having a global positioning system receiver.

2. Description of the Related Art

In the early 1970's, global positioning system (GPS) was introduced as a military system for locating objects on the ground. GPS is today commonly used a geographic information system for aiding as the navigation device of airplanes, ships and vehicles. GPS detects a position of a person, a car or a mobile device. Personal mobile GPS receivers are utilized to explore unknown areas or detect a position of a target on earth.

GPS positional data contains an error range of approximately 50 meters for military, and 200 meters for non-military use. Differential GPS (DGPS) provides a reduced error range of 5 meter.

Referring to FIG. 1, a GPS includes twenty-four satellites and two primary satellites. The majority of the satellites are maintained at an altitude of 20200 km. Four satellites are non-uniformly disposed at an altitude of six orbital surfaces. Each of the four satellites is spaced apart at 60 degree intervals. The four satellites receive simultaneously four or more signals measuring an object's position on the ground. The more signals received by more satellites, the more accurate the measurement is of an object's position.

Referring to FIG. 2, a general folder type mobile terminal comprises a cover part 200, a body part 100 and a hinge part 300 connecting the cover part 200 and the body part 100. The cover part 200 includes a display unit 210, and a speaker and a vibrating motor inserted at an upper side of the display unit 210. The body part 100, on which a keypad is formed, includes a main printed circuit board. The display unit 210 receives power from the main printed circuit board or various signals through a flexible printed circuit board. The flexible printed circuit board provides an electronic product that is compact, light, heat resistant, flexible and chemically resistant.

Referring to FIG. 3, the conventional mobile terminal receives signals including global positioning system (GPS) and code division multiple access (CDMA) signal through a GPS/CDMA antenna unit 105. A CDMA transceiver block 120 transmits and receives the CDMA and GPS signal. A GPS receiver 130 processes a received GPS signal. A diplexer 110 selectively transmits a received signal from the antenna unit 105 to the CDMA transceiver block 120 or to the GPS receiver 130. A mobile system modem (MSM) 140 controls transmission and reception of signals form the CDMA transmitting/receiving block 120 and the GPS receiver 130.

The GPS receiver 130 and the CDMA transceiver block 120 are adjacent and share the antenna unit 105. The CDMA mobile terminal in North America supports both the CDMA transceiver block 120 and the GPS receiver 130 using one antenna unit 105. A signal distributor 10 such as a diplexer, an RF switch such as single pole double throw (SPDT) switch, or a single pole triple throw switch (SP3T) switch, or the like switches signal from the antenna unit 105 to either the CDMA transceiver block 120 or the GPS receiver 130.

When the antenna unit 105 receives the CDMA signal, the diplexer 110 transmits the signal to the CDMA transceiver block 120 using a diplexer 110. Meanwhile, when the GPS signal is received by the antenna unit 105, the received GPS signal is applied to the GPS receiver 130. The GPS receiver 130 and the CDMA transceiver block 120 being adjacent to each other and sharing the antenna unit 105 cause signal interference to occur. Mutual signal interference between the CDMA signal and the GPS signal degrades a receive performance of the GPS receiver 130. The conventional mobile terminal has high path loss because of the long distance between the antenna unit 105 and the GPS receiver 130.

Therefore, there is a need for improved system and method that overcomes the above problems and provides advantages over conventional signal receiving systems.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In one embodiment, the system is provided comprising a display unit for displaying messages, and a first receiver mounted on a side of a display unit for receiving a first frequency signal. The side may be an upper side of the display unit. A second receiver may also be disposed on the mobile terminal for receiving a second frequency signal. A first antenna may also be disposed on a side of the mobile communication terminal. The first receiver may be a global positioning system receiver. In one alternative, the first receiver, the speaker, and/or the vibrating motor are of a modular body type.

In another embodiment, a method is disclosed comprising receiving a first frequency signal in a first receiver mounted with a vibrating motor on one side of a display unit, wherein the one side is an upper side of a display unit. A second receiver may also be provided on the mobile terminal for receiving a second frequency signal. A first antenna may also be disposed on a side of the mobile communication terminal. In one example, the first receiver is a global positioning system receiver.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

The invention relates to a mobile terminal having a GPS (Global Positioning System) receiver mounted at the top of a cover unit with improved isolation from an adjacent antenna.

Although the invention is illustrated with respect to a mobile terminal for receiving a GPS signal, it is contemplated that the invention may be utilized anywhere it is desired for transmitting, receiving, or processing signals. Reference will now be made in detail to the preferred embodiments of the present invention, examples of which are illustrated in the accompanying drawings.

The invention provides a GPS receiving system for a mobile terminal having a GPS receiver mounted with a speaker and a vibrating motor at an upper side of a display unit that is separate from a code division multiple access (CDMA) receiving system. A GPS receiver has an internal antenna for receiving a GPS signal. The present invention provides a speaker, vibrating motor, and GPS receiver that are all of one-body type module.

The invention provides a GPS receiver communicating a signal between a mobile station modem (MSM) through a flexible printed circuit board (FPCB) to a display unit. Alternatively a transmission line and a reception line connected to a universal asynchronous receiver/transmitter. (UART) provide an RF transmission link between a GPS receiver and a MSM.

Figure 1:
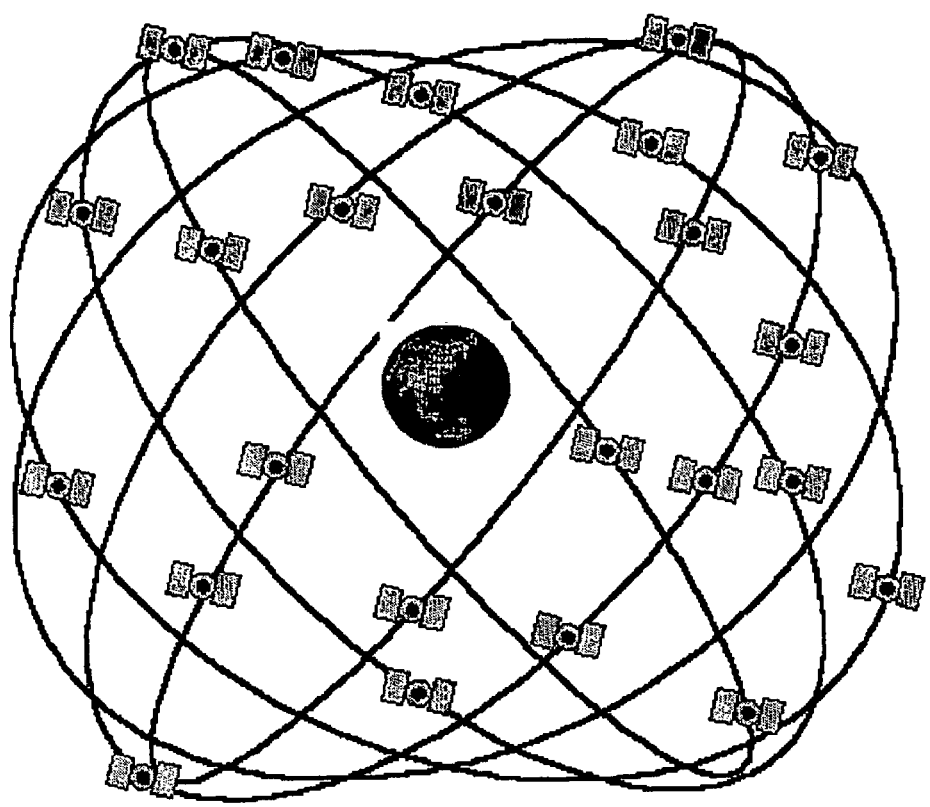
FIG. 1 illustrates a GPS system.
Figure 2:
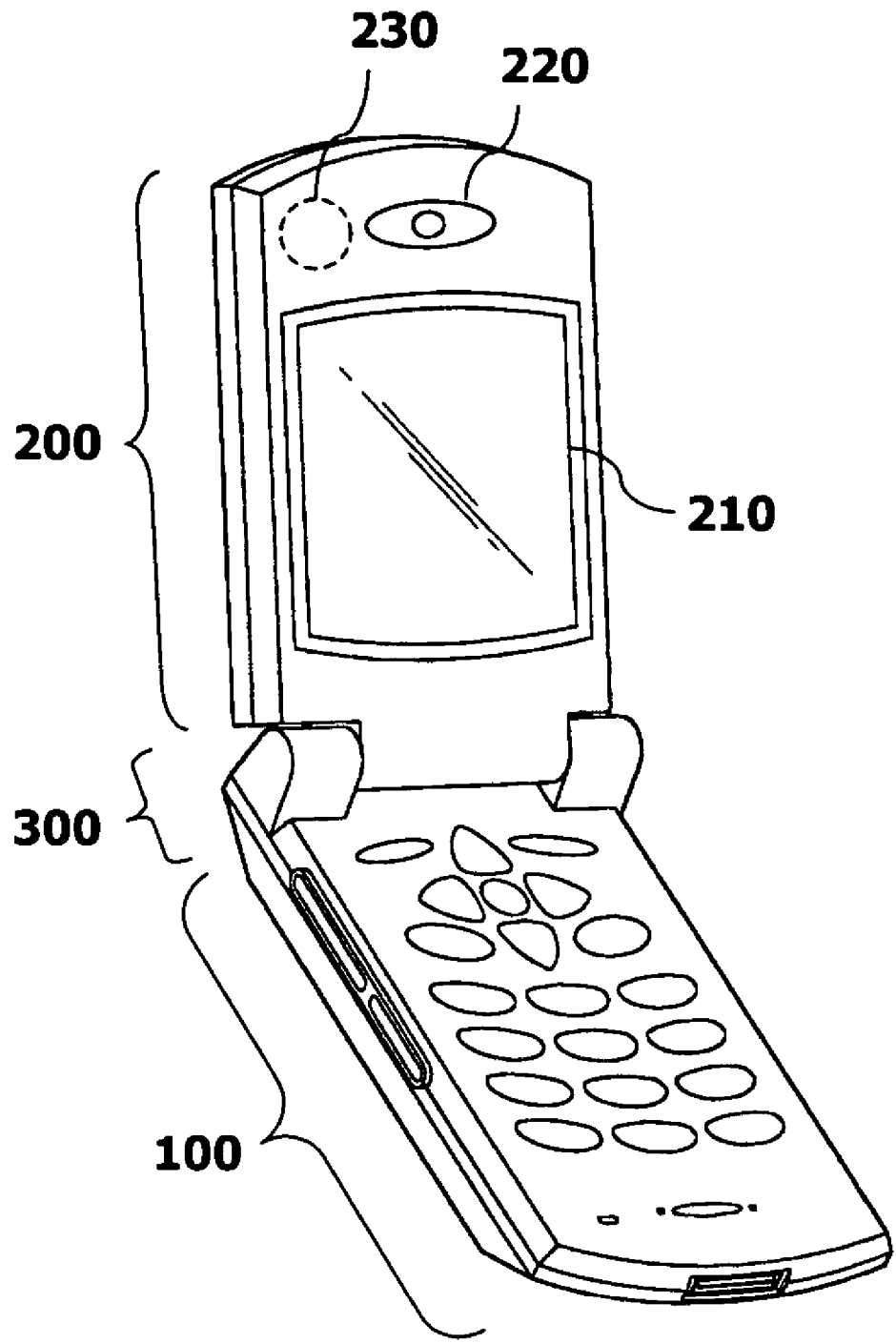
FIG. 2 illustrates a conventional folder type mobile terminal.
Figure 3:
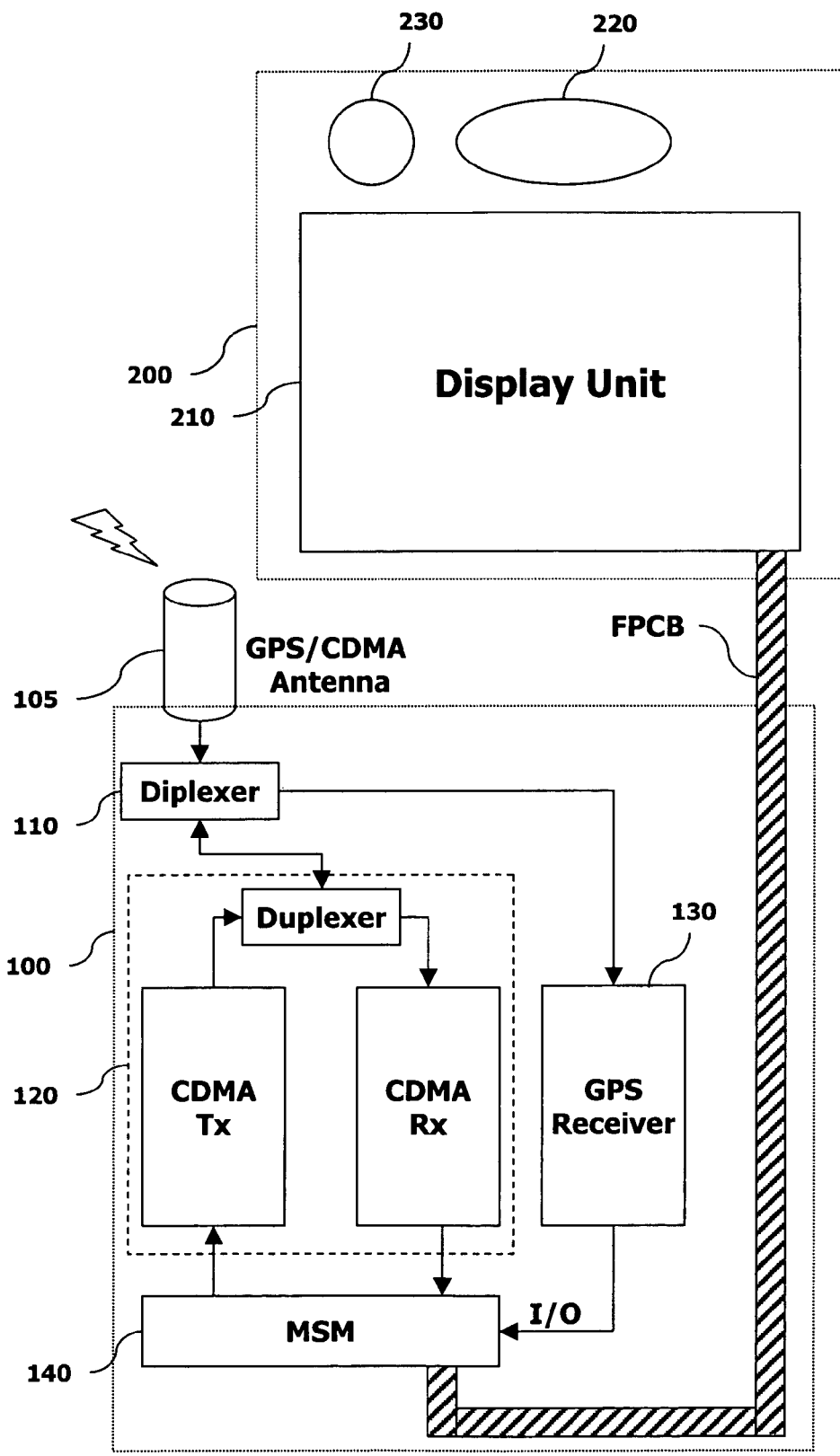
FIG. 3 is a block diagram illustrating internal electrical components of a conventional mobile terminal.
Figure 4:
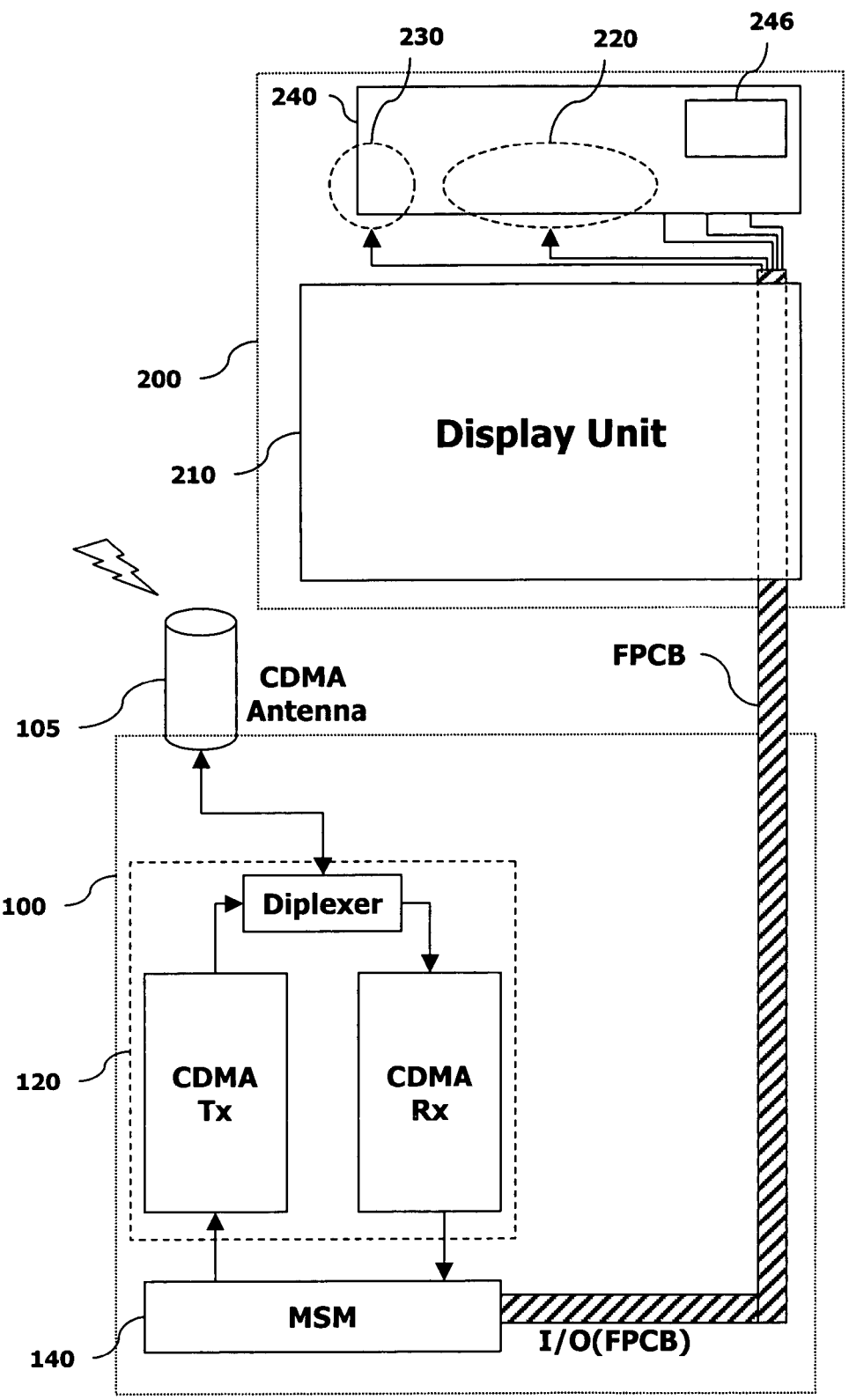
FIG. 4 is a block diagram illustrating internal electrical components of a mobile terminal in accordance with one embodiment of the present invention.

Referring to FIG. 4, a GPS receiver 240 comprises a GPS antenna at the top of a cover part 200. The cover part 200 of the mobile terminal includes a speaker 220, a vibrating motor 230, a display unit 210 and a GPS antenna 246. The mobile terminal, in this example, comprises a GPS receiver 240 inserted proximal to a side, such as a front or rear side, of the speaker 220 and the vibrating motor 230. In one embodiment, the speaker 220, the vibrating motor 230 and the GPS receiver 240 are integrated as one body being preferably modularized.

Figure 5:
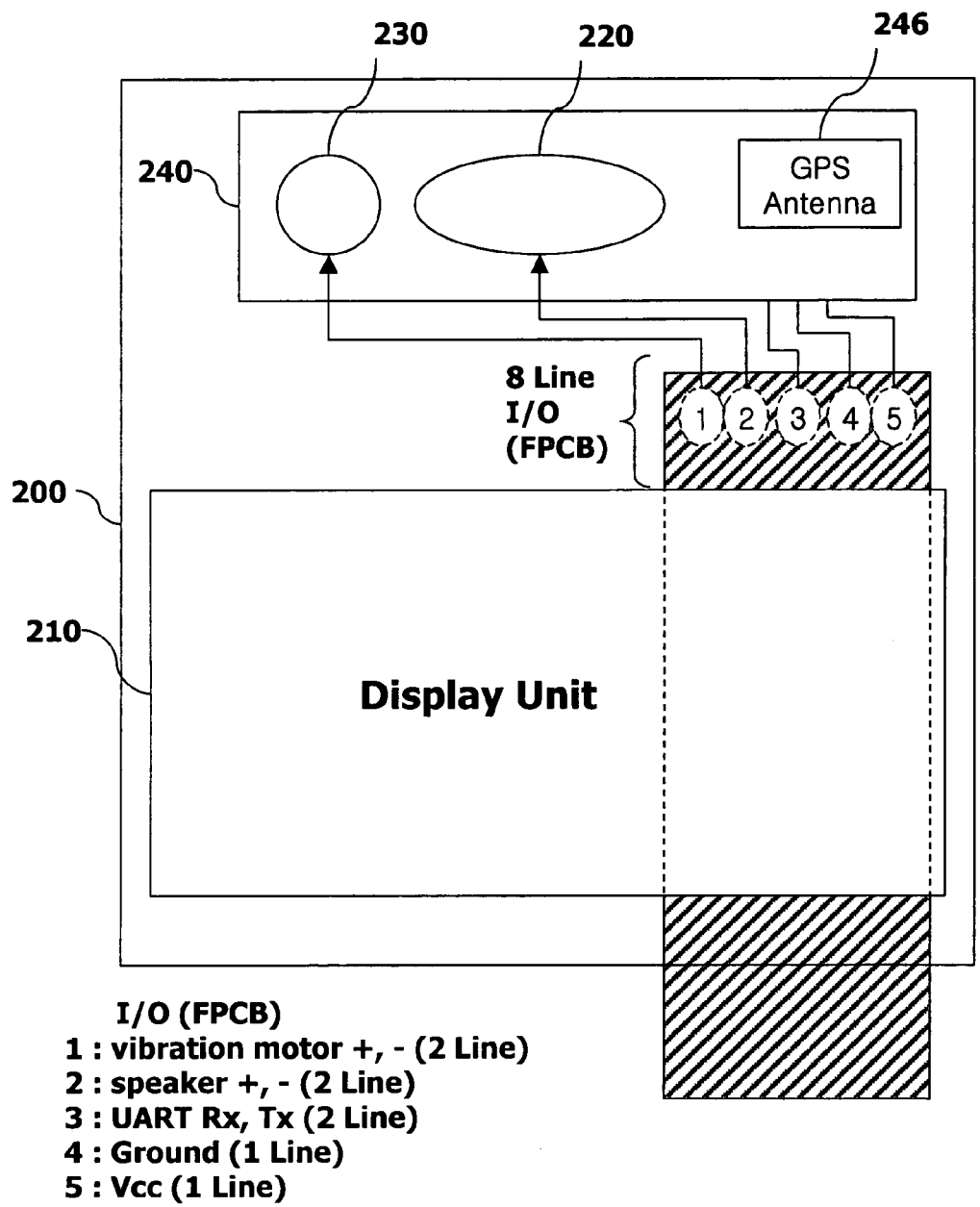
FIG. 5 is a block diagram illustrating in more detail the electrical components of an upper portion of FIG. 4.

Referring to FIG. 5, a GPS receiver module with the speaker 220, the vibrating motor 230 and the GPS receiver 240 are modularized. The mobile terminal comprises two signal transmission lines—UART Tx and UART Rx—in the FPCB for the display unit 210. In another embodiment, a camera accompanies the display unit 210. The GPS receiver 240 performs signal transmission and reception to and from the mobile system modem (MSM) 140. One side of the signal transmission lines—UART Tx and UART Rx—being connected to the MSM 140 and the other side being connected to the GPS receiver 240 which bypasses the display unit 210.

The FPCB includes a power line, such as Vcc line in this example, and a ground line for the GPS receiver 240. The GPS receiver 240 shares the power line with the display unit 210. The mobile terminal uses the antenna unit 105 of the body part 100 only for the purpose of mobile communication so that the signal distributor 110 such as the diplexer or the RF switch is not used for the body part 100.

Figure 6:
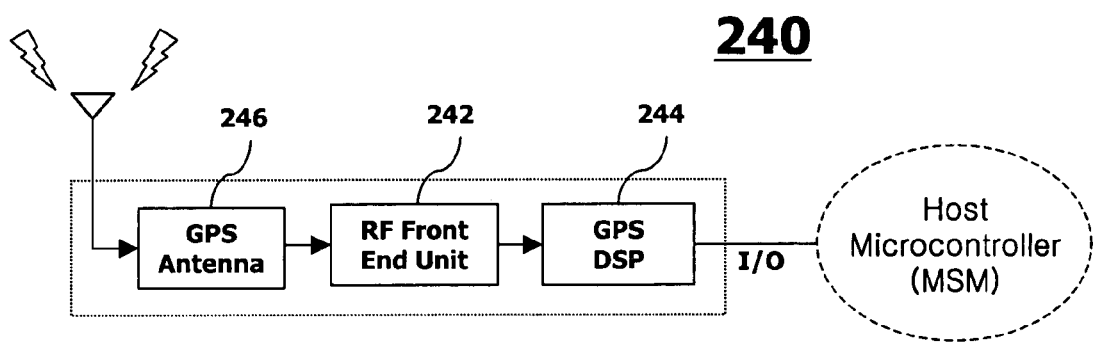
FIG. 6 is a block diagram illustrating in the structure of a GPS receiver in accordance with one embodiment of the present invention.

Referring to FIG. 6, the GPS receiver 240 comprises an antenna unit 246 for receiving a GPS signal. An RF front-end unit 242 amplifies the received GPS signal, down-converting it, and analog-to-digital converting it. A GPS digital signal processor (DSP) 244 calculates a user position through detecting a coarse acquisition (C/A) code from an output signal of the RF front-end unit 242. When the antenna unit 246 receives a GPS signal, the signal is amplified, down converted, and analog-digital converted using the RF front end unit 242. The GPS DSP 244 detects the C/A code from the analog-to-digital converted GPS signal. The GPS calculates a position of a user, and transmits the signal to the MSM 140 through a signal transmission line—UART Tx or UART Rx—of the FPCB to the display unit 210.

The invention provides a GPS receiver, such as GPS receiver 240 described above, and the antenna unit 105 with a separation distance for isolation of CDMA and GPS signals. Thus, signal interference between the GPS antenna 246 and the radio communication-purposed antenna 105 is reduced, and accordingly, radio receive performance may be enhanced.

The invention provides a GPS receiver 240, a speaker 220 and a vibrating motor 230 being modularized provide improved efficiency of mass-producing assembling units.

The present invention provides for a signal distributor, such as a diplexer or the RF switch, not being required to be integrated into the body part 100 of a mobile terminal; thus, this feature reduces the cost for adding a GPS antenna to a CDMA mobile terminal.

The present invention provides a GPS antenna inserted in the GPS receiver, which structure provides a solution to high transmission loss between the antenna unit and the GPS receiver.

Although the present invention is described in the context of a mobile terminal, the present invention may also be used in any wired or wireless communication systems using mobile devices, such as PDAs and laptop computers equipped with wired and wireless communication capabilities. Moreover, the use of certain terms to describe the present invention should not limit the scope of the present invention to certain type of wireless communication system, such as UMTS. The present invention is also applicable to other wireless communication systems using different air interfaces and/or physical layers, for example, TDMA, CDMA, FDMA, WCDMA, etc.

The preferred embodiments may be implemented as a method, system or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The logic implementation shown in the figures described specific operations as occurring in a particular order. In alternative implementations, certain of the logic operations may be performed in a different order, modified or removed and still implement preferred embodiments of the present invention. Moreover, steps may be added to the above described logic and still conform to implementations of the invention. Further, with respect to the claims, it should be understood that any of the claims described below may be combined for the purposes of the present invention.

The foregoing embodiments and advantages are merely exemplary and are not to be construed as limiting the present invention. The present teaching can be readily applied to other types of systems. The description of the present invention is intended to be illustrative, and not to limit the scope of the claims. Many alternatives, modifications, and variations will be apparent to those skilled in the art. Accordingly, the invention is not limited to the precise embodiments described in detail hereinabove.

What is claimed is:

1. A mobile communication terminal comprising:
   a speaker for emitting sound;
   a vibrating motor for generating vibration;
   a display unit for displaying information;
   a housing unit for housing the speaker, the vibrating motor, and the display unit; and
   an antenna-mounted global positioning system (GPS) receiver mounted in the housing unit and located in an upper area adjacent to the display unit such that the GPS receiver is isolated from an other antenna,
   wherein the GPS receiver is housed in a one-body module comprising the speaker and the vibrating motor,
   wherein the antenna of the GPS receiver is configured to be located at a top side of the one-body type module,
   wherein the GPS receiver communicates a signal with a mobile station modem (MSM) via a printed circuit board, and
   wherein the GPS receiver shares a power line with the display unit.

2. The mobile communication terminal of claim 1, wherein the other antenna is configured to receive a CDMA (code division multiple access) signal.

3. The mobile communication terminal of claim 1, wherein the mobile communication terminal is a folder-type terminal.

4. The mobile communication terminal of claim 1, wherein the printed circuit board comprises a transmission line and a reception line of a universal asynchronous transceiver configured to transmit the signal between the GPS receiver and the MSM.

* * * * *